US008450222B2

(12) United States Patent
Pritchard et al.

(10) Patent No.: US 8,450,222 B2
(45) Date of Patent: May 28, 2013

(54) COATED MULTI-THREAT MATERIALS AND METHODS FOR FABRICATING THE SAME

(75) Inventors: Laura Pritchard, Rochester, NY (US); Shekoufeh Shahkarami, Ancaster (CA); Joseph Krummel, Rising Sun, MD (US); Kevin Rayner, Burlington (CA); Jonathan MacNeil, Cambridge (CA)

(73) Assignee: Barrday Inc., Cambridge, Ontario (CA)

( * ) Notice: Subject to any disclaimer, the term of this patent is extended or adjusted under 35 U.S.C. 154(b) by 259 days.

(21) Appl. No.: 12/055,728

(22) Filed: Mar. 26, 2008

(65) Prior Publication Data

US 2008/0268733 A1 Oct. 30, 2008

Related U.S. Application Data

(60) Provisional application No. 60/908,078, filed on Mar. 26, 2007.

(51) Int. Cl.
*B32B 27/12* (2006.01)
*B05D 3/02* (2006.01)

(52) U.S. Cl.
USPC ......... 442/134; 442/135; 428/911; 427/389.9

(58) Field of Classification Search
USPC .................................. 442/134, 135; 428/911
See application file for complete search history.

(56) References Cited

U.S. PATENT DOCUMENTS

| 5,254,383 | A | 10/1993 | Harpell et al. |
| 5,308,689 | A | 5/1994 | Shinkai et al. |
| 5,935,678 | A | 8/1999 | Park |
| 6,280,546 | B1 | 8/2001 | Holland |
| 6,662,369 | B2 | 12/2003 | Fuchs et al. |
| 6,737,368 | B2 | 5/2004 | Chiou |
| 2003/0129900 | A1 | 7/2003 | Chiou |
| 2005/0153098 | A1 | 7/2005 | Bhatnagar et al. |

FOREIGN PATENT DOCUMENTS

| CA | 2387830 | 2/2002 |
| EP | 0 862 722 B1 | 1/2002 |

(Continued)

OTHER PUBLICATIONS

International Searching Authority (International Search Report, PCT Applicaiton No. PCT/CA2008/000560 Jul. 15, 2008.

*Primary Examiner* — Jennifer A Steele
(74) *Attorney, Agent, or Firm* — Bereskin & Parr LLP (57) ABSTRACT

According to some aspects, a method of manufacturing a coated multi-threat fabric, including providing a first fabric layer having a first surface, the first fabric layer having a plurality of high performance fibers, applying a first polymeric material onto the first surface of the first fabric layer, the polymeric material having a melt flow index of between about 0.7 to 1400 g/10 min, a Shore D hardness of between about 36 and 75, and ultimate tensile strength of between about 5 and 75 MPa, spreading the first polymeric material onto the first surface of the first fabric layer so as to form a raw coated fabric having a first coating layer, and heating the raw coated fabric to bond the first coating layer to the first fabric layer, wherein the first polymeric material is selected such that the coated multi-threat fabric is flexible enough to be stored on a roll of a predetermined size. In some aspects, a coated multi-threat fabric includes at least one layer of fabric, each layer having a plurality of high performance fibers, and at least one coating of polymeric material bonded to the at least one layer of fabric, the polymeric material comprising an ethylene acrylic acid copolymer selected to allow the coated multi-threat fabric to be stored on a roll of a predetermined size.

19 Claims, 3 Drawing Sheets

FOREIGN PATENT DOCUMENTS

| | | |
|---|---|---|
| EP | 1 248 703 B1 | 6/2004 |
| EP | 1 456 016 B1 | 7/2006 |
| WO | WO 97/21334 A2 | 6/1997 |
| WO | WO 98/45662 A1 | 10/1998 |
| WO | WO 01/29299 A2 | 4/2001 |
| WO | WO 01/30567 A1 | 5/2001 |
| WO | WO 01/96111 A1 | 12/2001 |
| WO | WO 03/053676 A1 | 7/2003 |

COATED MULTI-THREAT MATERIALS AND METHODS FOR FABRICATING THE SAME

RELATED APPLICATIONS

This application claims the benefit of U.S. Provisional Application No. 60/908,078, filed Mar. 26, 2007, entitled "COATED MULTI-THREAT MATERIAL AND METHOD FOR FABRICATING THE SAME", the entire contents of which are hereby incorporated by reference for all purposes

FIELD

The embodiments described herein relate to the field of multi-threat protective materials, and more particularly to protective fabrics coated with polymeric materials and methods of making the same.

BACKGROUND

Protective materials suitable for use in stab, impact or ballistic-resistant body armors are known in the art. The type of ballistic threat to be managed typically defines the body armor solution used. For example, soft ballistic armor designs are generally suitable for handgun bullets and non-deformable fragments. Rigid ballistic armor, on the other hand, may be used for high-energy rifles and the like. Finally, stab-resistant product designs may be used for protection from spikes and edged weapons. However, there is a growing demand in both military and civilian protection markets for materials that are effectively able to protect against multiple threats.

Currently, film impregnated fabric-based materials are available for use in multi-threat protective materials. However, known film-based solutions generally involve application of a polymer film on each side of the fabric and require heat, pressure and time to ensure good penetration of the film into the fabric. These conditions can generally only be achieved in a press, which dictates that the material is made in a sheet format. Furthermore, the sheet size is generally limited by the size of the pressing equipment used to impregnate the fabric.

There are a number of practical problems associated with multi-threat resistant materials being produced in sheet format. For example, the use of sheets tends to produce a high scrap rate during production of end-use body armor or other articles since not all patterns may fit efficiently within the dimensions of a particular sheet. Furthermore, different base fabrics may require different weights of film during manufacturing of different protective materials. Accordingly, this requires that an inventory of different films having varying thicknesses be kept on hand in order to accommodate different production runs. This is generally undesirable and may increase production costs.

Alternative fabrics that add some stab-protection to ballistic fabrics include fabrics in which abrasive additives (e.g. hard silicone carbide particles) are applied in a top coating to blunt or dull a knife or piercing edge to limit penetration. However, such products tend to shed their surface layer of abrasives over time, resulting in diminished protection.

Accordingly, there is a need for multi-threat protective materials that overcome at least some of the above noted disadvantages.

SUMMARY

According to one aspect of the invention, there is provided a coated multi-threat fabric, comprising at least one layer of fabric, each layer having a plurality of high performance fibers, and at least one coating of polymeric material bonded to the at least one layer of fabric, the polymeric material comprising an ethylene acrylic acid copolymer selected to allow the coated multi-threat fabric to be stored on a roll of a predetermined size. The ethylene acrylic acid copolymer may have a melt flow index of between about 250 g/10 min and 1400 g/10 min at about 190 degrees C., a Shore D hardness of between about 40 and 55, an ultimate tensile strength of between about 5.0 and 12.0 MPa, and a molecular weight of between about 15,000 and 33,000. The high performance fibers may have a tenacity of at least about 15 grams per denier, a tensile modulus of at least about 400 grams per denier, and a linear mass density between about 330 dtex and 3360 dtex. The high performance fibers may be selected from the group consisting of aramid fibres, para-aramid fibres, ultra-high molecular weight polyethylene fibers, poly(p-phenylene-2,6-benzobisoxazole) (PBO) fibers, liquid crystal fibers, and glass fibers. The at least one layer of fabric may comprise a first fabric layer and a second fabric layer, and the at least one coating of polymeric material may comprise a first coating provided between the first fabric layer and the second fabric layer, the first coating being bonded to both the first fabric layer and the second fabric layer, and a second coating bonded to the second fabric layer opposite the first fabric layer.

According to another aspect of the invention, there is provided a coated multi-threat fabric, comprising at least one layer of fabric, each layer of fabric having a plurality of high performance fibers selected from the group consisting of aramid fibres, para-aramid fibres, ultra-high molecular weight polyethylene fibers, poly(p-phenylene-2,6-benzobisoxazole) (PBO) fibers, liquid crystal fibers, and glass fibers, and at least one coating of polymeric material bonded to the at least one layer of fabric, the polymeric material selected from the group consisting of polyesters, polypropylenes, polyurethanes, polyethers, polybutadiene, polyacrylate, copolymers of ethylene, polycarbonates, ionomers, and ethylene acrylic acid copolymers, the polymeric material having a melt flow index of between about 0.7 to 1400 g/10 min, a Shore D hardness of between about 36 and 75, and ultimate tensile strength of between about 5 and 75 MPa. The polymeric material may be an ethylene acrylic acid copolymer with a melt flow index of between about 250 g/10 min and 1400 g/10 min at about 190 degrees C. The polymeric material may be an ethylene acrylic acid copolymer having a Shore D hardness of between about 40 and 55. The polymeric material may be an ethylene acrylic acid copolymer having an ultimate tensile strength of between about 5.0 and 12.0 MPa. The polymeric material may be an ethylene acrylic acid copolymer having a molecular weight of between about 15,000 and 33,000.

The at least one layer of fabric may comprise a first fabric layer and a second fabric layer, and the at least one coating of polymeric material may comprise a first coating provided between the first fabric layer and the second fabric layer, the first coating being bonded to both the first fabric layer and the second fabric layer, and a second coating bonded to the second fabric layer opposite the first fabric layer. The at least one coating may further comprise a third coating bonded to the first fabric layer opposite the second fabric layer.

The high performance fibers may have a tenacity of at least about 15 grams per denier, a tensile modulus of at least about 400 grams per denier, and a linear mass density between about 330 dtex and 3360 dtex. The at least one fabric layer may be selected from a group consisting of woven, knitted, plied and unidirectional fabrics.

According to yet another aspect of the invention, there is provided a method of manufacturing a coated multi-threat fabric, comprising providing a first fabric layer having a first surface, the first fabric layer having a plurality of high performance fibers, applying a first polymeric material onto the first surface of the first fabric layer, the polymeric material having a melt flow index of between about 0.7 to 1400 g/10 min, a Shore D hardness of between about 36 and 75, and ultimate tensile strength of between about 5 and 75 MPa, spreading the first polymeric material onto the first surface of the first fabric layer so as to form a raw coated fabric having a first coating layer, and heating the raw coated fabric to bond the first coating layer to the first fabric layer, wherein the first polymeric material is selected such that the coated multi-threat fabric is flexible enough to be stored on a roll of a predetermined size.

The polymeric material may be an ethylene acrylic acid copolymer with a melt flow index of between about 250 g/10 min and 1400 g/10 min at about 190 degrees C., a Shore D hardness of between about 40 and 55, an ultimate tensile strength of between about 5.0 and 12.0 MPa, and a molecular weight of between about 15,000 and 33,000, and the high performance fibres may be selected from the group consisting of aramid fibres, para-aramid fibres, ultra-high molecular weight polyethylene fibers, poly(p-phenylene-2,6-benzobisoxazole) (PBO) fibers, liquid crystal fibers, and glass fibers.

The spreading of the polymeric material may result in the first coating layer having a coating weight of between about 20 and 200 g/m$^2$. The raw coated fabric may be dried in a drying oven at a temperature of approximately 80-100 degrees C. for a period of between about 2-5 minutes, and the raw coated fabric may be subsequently heated in a heat-setting unit at a temperature of approximately 150-200 degrees C. for at least 10 minutes.

The method may further comprise providing a second fabric layer having a second surface contacting the first coating layer opposite the first fabric layer, the second fabric layer having a third surface opposite the second surface, applying a second polymeric material onto the third surface of the second fabric layer, the second polymeric material selected from the group consisting of polyesters, polypropylenes, polyurethanes, polyethers, polybutadiene, polyacrylate, copolymers of ethylene, polycarbonates, ionomers, and ethylene acrylic acid copolymers, and spreading the second polymeric material onto the third surface of the second fabric layer so as to form a second coating layer on the raw coated fabric, wherein the heating of the raw coated fabric bonds the second coating layer to the second fabric layer.

The first fabric layer may comprise a fourth surface opposite the first surface, and the method may further comprise applying a third polymeric material onto the fourth surface of the first fabric layer, the third polymeric material selected from the group consisting of polyesters, polypropylenes, polyurethanes, polyethers, polybutadiene, polyacrylate, copolymers of ethylene, polycarbonates, ionomers, and ethylene acrylic acid copolymers, and spreading the third polymeric material onto the fourth surface of the third fabric layer so as to form a third coating layer on the raw coated fabric, wherein the heating of the raw coated fabric bonds the third coating layer to the first fabric layer.

According to other aspects of the invention, there is described a coated fabric and protective materials made therefrom, and methods by which coated fabrics may be made.

Some embodiments described herein provide enhanced resistance to stab, impact or ballistic threats as compared to a similar weight of conventional material, and may be formed in a continuous roll process that allows for variable widths of fabric, variable coating weights, and does not require certain manufacturing equipment, such as presses.

According to other aspects of the invention, there is provided a coated fabric comprising a base fabric layer and a polymeric material that has been coated on the fabric layer and heat set, wherein the polymeric material is selected such that the coated fabric is sufficiently flexible to be stored on a roll of a predetermined size. In some embodiments, the polymeric material comprises an ethylene acrylic acid (EAA) copolymer and the fabric layer comprises high performance fibers.

The production of a protective coated fabric using a coating process in which a polymeric material is impregnated into a base fabric by heat setting provides a coated fabric that is flexible enough to be stored in rolls and has similar or improved protective properties as compared to conventional press formed protective fabrics.

According to another aspect of the invention, there is provided a method of forming a fabric, comprising applying an ethylene acrylic acid (EAA) polymeric material onto the surface of a base fabric, spreading the EAA polymeric material on the surface of the base fabric so as to form a coating layer, and heating the coated fabric such that it can be stored on a roll. The process of forming the coated fabric in a continuous manner tends to allow for improved manufacturing efficiencies and also tends to allow for greater flexibility in the sizes of fabrics that may be produced.

Further aspects and advantages of the embodiments described herein will appear from the following description taken together with the accompanying drawings.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

DETAILED DESCRIPTION

This description is not to be considered as limiting the scope of the embodiments described herein in any way, but rather as merely describing the implementation of various embodiments.

According to some embodiments, there is provided a coated multi-threat protective fabric, methods by which coated multi-threat protective fabrics may be made, and protective materials made using such coated protective fabrics.

Some embodiments of protective fabric make use of a base fabric made from what are commonly described as high performance fibers. Generally speaking, a high performance fiber is a fiber having a tenacity of at least 15 grams per denier, and tensile modulus of at least 400 grams per denier.

Examples of suitable high performance fibers include aramid or para-aramid fibers, ultra-high molecular weight polyethylene fibers, poly(p-phenylene-2,6-benzobisoxazole) (PBO) fibers, liquid crystal fibers and glass fibers. For example, Aramid and copolymer aramid fibers are produced commercially by E. I. du Pont de Nemours and Company, Teijin Twaron BV, Teijin, and Kolon under the trade names Kevlar™, Twaron™, Technora™, and Heracron™, respectively. Ultra-high molecular weight polyethylene fibers are produced commercially by Honeywell, DSM, and Mitsui under the trade names Spectra™, Dyneema™, and Tekmilon™, respectively. Polyethylene fibers and tapes are produced by Tensylon High Performance Materials and sold under the trade name Tensylon™. Poly(p-phenylene-2,6-benzobisoxazole) (PBO) is produced by Toyobo under the commercial name Zylon™. Liquid crystal polymers are produced by Kuraray Co. Ltd. under the trade name Vectran™.

In some embodiments, the fibers have a linear mass density between 440 dtex and 1580 dtex. In other embodiments, the fibers have a linear mass density between about 900 dtex and 1200 dtex. In yet other embodiments, the fibers have a linear mass density of between about 330 dtex and 3360 dtex.

As used herein, the term "fiber" refers to an elongate body the length dimension of which is generally much greater than the transverse dimensions of width and thickness. Accordingly, the term fiber includes filament, ribbon, strip, tape and the like, and may have a regular or irregular cross-section. In some embodiments, a plurality of fibers running in the same longitudinal direction may constitute a fiber.

A particular base fabric used in making a particular protective fabric may be made from a single type of fiber, or from various types of fibers, which in some examples may be blended together. The base fabric may include various types of fibers in each yarn or in different yarns that may be combined to make the base fabric.

In some embodiments, the base fabric is woven. For example, woven base fabrics may include any weave such as a plain weave, crowfoot weave, basket weave, satin weave, twill weave, proprietary weaves or the like. In other embodiments, the base fabric may be a knitted or non-woven fabric. Non-woven fabrics may include unidirectional fabrics, including plied unidirectional fabrics wherein the fibers of adjacent unidirectional fabric layers are oriented to be perpendicular or at another angle relative to one another. The base fabric may also be plied, consisting of one or more layers attached together using an adhesive, thermal adhesive, stitching, matrix, or any other known methods for combining layers of fabric.

As used herein, the terms "fabric" and "fabric layer" generally refer to a plurality of fibers that have been arranged so as to form a generally continuous sheet.

The polymeric materials used in the protective fabrics generally have high hardness, good flow properties and good adhesion to the base fabric without resulting in a finished product that is overly stiff or brittle. Furthermore, the polymeric materials are generally capable of forming a relatively thin and generally continuous layer when applied to the surface of the base fabric to form a uniform coating on the base fabric.

Various polymeric materials are believed to be effective, including thermosets and thermoplastics, such as polyesters, polypropylenes, polyurethanes, polyethers, polybutadiene, polyacrylate, copolymers of ethylene, polycarbonates, ionomers and ethylene acrylic acid (EAA) copolymers.

In some embodiments, the polymeric material is a thermoplastic ionomer class material created from acid copolymers, such as the commercially available Surlyn® resin. For example, Surlyn® thermoplastic ionomers from Dupont with a melt flow index of about 0.7-20.0 g/10 min, a Shore D Hardness of about 36-68 and an ultimate tensile strength of between about 15.9-37.2 MPa may be suitable.

Melt flow index may be calculated according to methods known in the art, as described for example in ASTM D 1238-04 and ISO 1133 2005, the entire contents of which are herein incorporated by reference.

In other embodiments, the polymeric material may be a polycarbonate (a polymer having functional groups linked together by carbonate groups in a long molecular chain). In particular examples, polycarbonate polymeric materials with a melt flow index of about 13.3-17.8 g/10 min, a Shore D hardness of about 55-75 and an ultimate tensile strength between about 55-75 MPa may be suitable. In some examples, the melt flow index of polycarbonate polymeric materials may be tested according to ASTM D 1238-04 at about 300 degrees C.

In yet other embodiments, the polymeric material may be a polyurethane (a polymer consisting of a chain of organic units joined by urethane links). For example, polyurethane polymeric materials having a melt flow index of about 4-13 g/10 min, a Shore D Hardness of about 60-75 and an ultimate tensile strength of between about 27.6-68.9 MPa may be suitable. In some examples, the melt flow index of polyurethane polymeric materials may be tested according to ASTM D 1238-04 at about 190 degrees C.

In still further embodiments, the polymeric material may be an ethylene acrylic acid (EAA) copolymer. EAA copolymers are available with a wide range of characteristics including molecular weight, melt flow rate, and hardness. For example, Michem® Prime EAA copolymers having a melt flow index of about 250-1400 g/10 min (at about 190 degrees C.), a Shore D hardness of about 40-55, and an ultimate tensile strength from about 5.0-12.0 MPa are generally suitable.

EAA copolymers may be considered as highly suitable polymeric materials for the methods and coated fabrics described herein, since EAA copolymers tend to have high melt flow indices while maintaining a relatively high hardness when compared to other polymeric materials.

In some embodiments, EAA copolymers with a molecular weight of between about 15,000 and 33,000 may be used as the polymeric material. In other embodiments, EAA copolymers have a molecular weight of between about 16,000 and 32,000. In yet other embodiments, EAA copolymers have a molecular weight of between about 18,000 and 30,000. Generally speaking, EAA copolymers with higher molecular weights tend to exhibit poor flow characteristics, while those with lower molecular weights tend to exhibit reduced resistance to penetration.

Some commercially available EAA copolymers suitable for coated multi-threat fabrics include ethylene acrylic acid dispersions such as Michem® Prime 498345N and Michem® Prime 4990R, both available from Michelman Inc., located in Cincinnati, Ohio.

The polymeric material may optionally include a viscosity-controlling compound (e.g. a thickener or co-solvent) to control viscosity. The polymeric material may also optionally contain additional cross-linkers, such as carboxy functional crosslinking agents, which may provide additional crosslinking during heat setting and may tend to provide additional stab protection. The polymeric material may optionally also contain other substances configured to alter the surface properties of the polymeric coating. For example, dyes may be used in the polymeric material for coloring of the coated fabric, and abrasive particles may be added to the polymeric material to further enhance stab protection.

Figure 1:
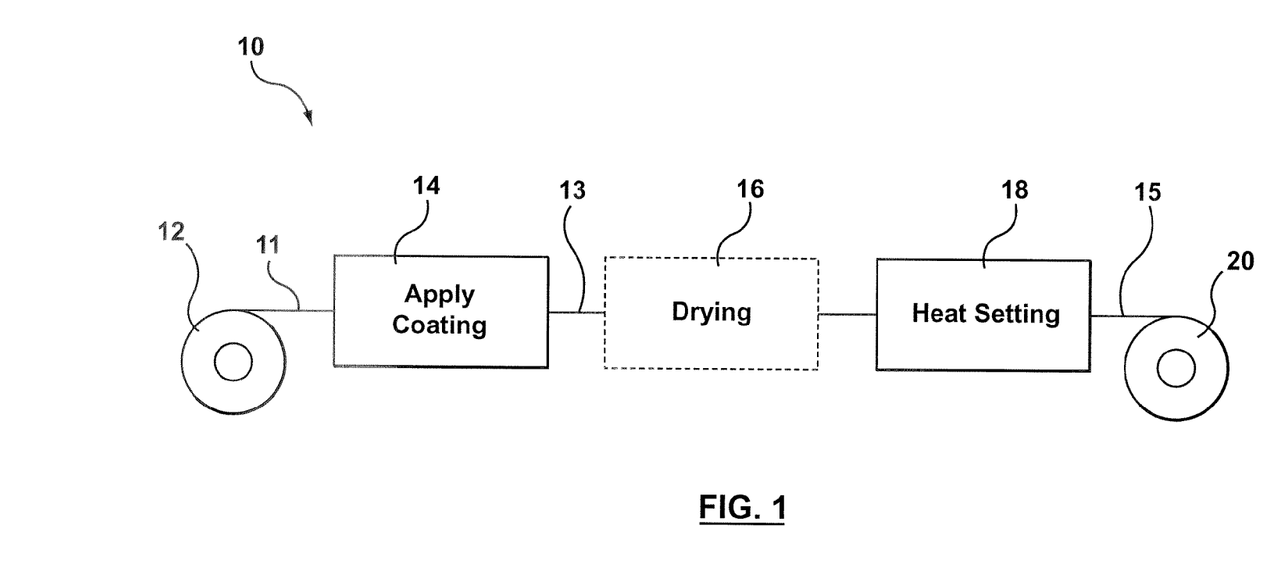
FIG. 1 is a schematic illustration of a method for producing a coated fabric according to one embodiment.

Turning now to FIG. 1, illustrated therein is a schematic diagram showing a method 10 for producing a coated fabric according to one example. In this example, a base fabric 11 (e.g. a generally continuous sheet of high performance fibers) is provided on a roll 12, which may of different sizes and shapes according to the design and sizing requirements for a particular coated fabric.

The base fabric 11 may be fed from the roll 12 to a coating station 14. The coating station 14 applies a polymeric material in a liquid form (e.g. an ethylene acrylic acid (EAA) copolymer) to at least one side or surface of the base fabric 11, producing a raw coated fabric 13. For example, the polymeric material may be applied to the base fabric 11 such that the polymeric material substantially covers the base fabric 11.

The coating station 14 may make use of various known application techniques, including for example knife-over-roll, air-over roll, rod applicators, dip coating or impregnation, spraying, brushing or other suitable methods of applying a liquid to a fabric.

Following the application of the polymeric material, the raw coated fabric 13 may optionally proceed to a drying station 16, wherein the raw coated fabric 13 may be dried to remove moisture. Various methods for drying the fabric will be suitable, and may include feeding the raw coated fabric 13 through a drying oven for a predetermined period of time at a predetermined temperature. For example, the raw coated fabric 13 may be dried in a drying oven at a temperature of approximately 80-100 degrees C. for a period of between about 2-5 minutes. The drying process is not required, but may be useful in some examples, such as where the raw coated fabric 13 is to be placed onto a roll so that it can be moved to another station or machine, or in a situation where the raw coated fabric 13 has been coated on a first side, and is to be subsequently coated on the opposite side as well.

The raw coated fabric 13 (which may have been subjected to a drying process 16) is then fed to a heat setting station 18 wherein the raw coated fabric 13 is heated to a temperature selected to allow the polymeric material to flow further into the base fabric 11 and to heat set such that cross-linking occurs and the polymeric material is bonded to the base fabric 11. The heat setting station 18 may include an oven. For example, the raw coated fabric 13 may be heated in an oven at a temperature of between approximately 150-200 degrees C. for at least 10 minutes or more.

After leaving the heat setting station 18, the finished coated fabric 15 may be collected on a second roll 20, which may be used for example for transportation or storage of the finished coated fabric 15. The second roll 20 may be of different sizes and shapes according to the design and sizing requirements for a particular coated fabric. The polymeric material is generally selected such that the finished coated fabric 15 is flexible enough so that it may be received onto the second roll 20. In some embodiments, the second roll 20 has a roll diameter of less than three feet. In other embodiments, the second roll 20 has a roll diameter of less than twelve inches.

The base fabric 11 may have been initially been prepared at another location, and may be transported to the coating station via the roll 12. However, the base fabric 11 could be fed directly to the coating station 14 from an earlier process, for example directly from a weaving machine, and the first roll 12 may not be required. In this manner, the method 10 may form part of a continuous or semi-continuous process for manufacturing coated fabrics.

Figure 2:
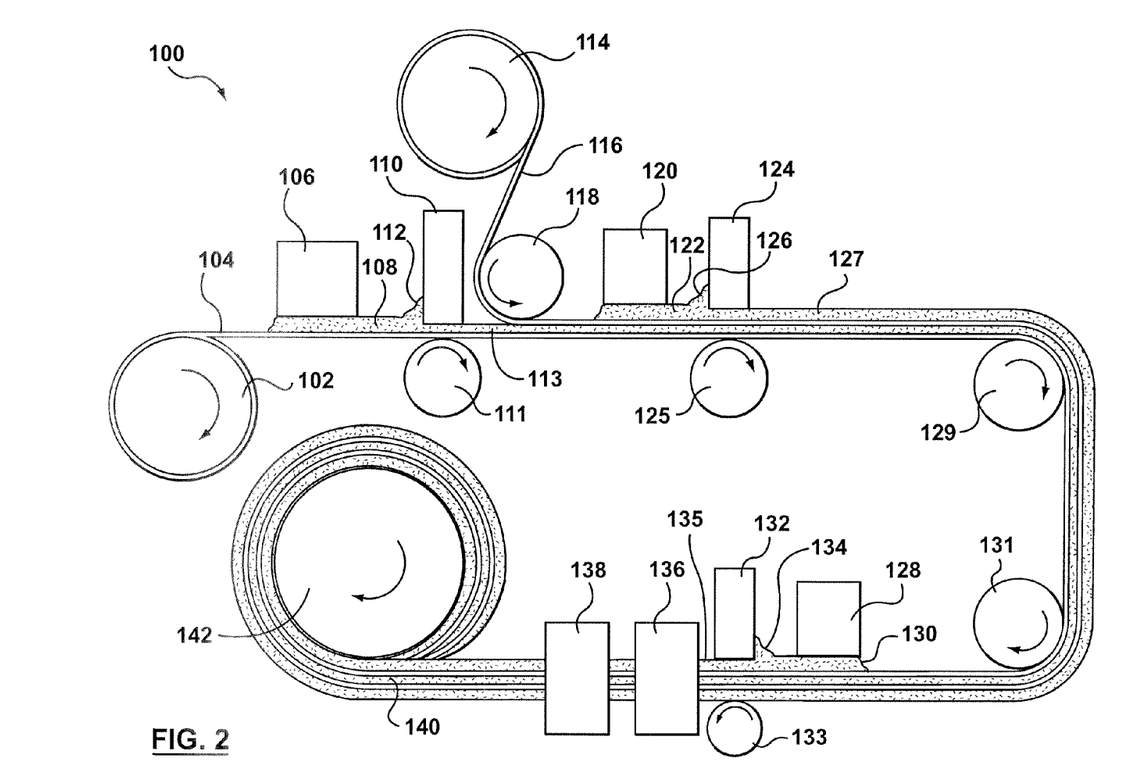
FIG. 2 is a schematic illustration of a knife-over-roll apparatus for spreading polymeric material onto a base fabric to form a coated fabric according to another embodiment.

Turning now to FIG. 2, illustrated therein is a system 100 for producing a coated multi-threat fabric in which a polymeric material is applied using a knife-over-roll coating method. A first layer of base fabric 104 is provided on a fabric let-off roll 102. From the roll 102, the fabric 104 is fed to a first polymer dispenser 106 that applies a first coating 108 of liquid polymeric material onto the base fabric 104. The base fabric 104 is then fed to a spreading apparatus, for example a straight edge or first knife 110, which generally spans the width dimension of the base fabric 104. The first knife 110 evenly spreads the first coating 108 of polymeric material over the surface of the base fabric 104, generating a first raw coated fabric 113 having a desired coating thickness or weight. For example, the raw coated fabric 113 may have a coating weight of between about 20-60 g/m$^2$.

An opposing roll 111 may be provided opposite the first knife 110 to facilitate the spreading process. As the knife 110 spreads the first coating 108 of polymeric material, excess polymeric material 112 may tend to build up on the leading edge of the knife 110. The excess polymeric material 112 may need periodic cleaning.

In some embodiments, the base fabric 104 moves past the dispenser 106 at a rate of approximately 3 m/min while the first coating 108 of polymeric material is applied.

In some embodiments, a coated multi-threat fabric having only the first layer 104 of base fabric and the first coating 108 of polymeric material may be desired. In such examples, after the first knife 110 spreads the first coating 108 of polymeric material, the first raw coated fabric 113 may be fed directly into a heat setting unit 138 (and optionally to a drying unit 136). In other embodiments, a second coating may be applied to the other side of the base fabric 104, resulting in a coated multi-threat fabric having a single fabric layer (e.g. base fabric 104) with a polymeric coating on both sides thereof.

In other embodiments, it is desired that a second fabric layer 116 be added to the coated fabric. In such cases, the second fabric layer 116 may be provided on a second let-off roll 114, and fed onto the first raw coated fabric 113 such that a bottom surface of the second fabric layer 116 engages the first coating 108 opposite the base fabric 104. The second fabric layer 116 may be guided using a guide roller 118 to properly position the second fabric layer 116 onto the first coating 108.

Once the second fabric layer 116 is engaged with the first raw coated fabric 113, in some embodiments the raw coated fabric 113 and second fabric layer 116 may be fed into a second dispensing unit 120, which dispenses a second layer 122 of polymeric material onto a top surface of the second fabric layer 116. A second knife 124 positioned opposite a second roll 125 may then be used to evenly spread the second layer 122 of polymeric material onto the top surface of the second fabric layer 116, generating a second raw coated fabric 127. The raw coated fabric 127 generally includes the base fabric 104, the second fabric layer 116, the first coating 108 between the base fabric 104 and the second fabric layer 116, and the second coating 122. In some examples, excess polymeric materials 126 may tend to build up on the leading edge of the second knife 124, and may require periodic cleaning. The second raw coated fabric 127 may then be fed to the heat-setting unit 138 (and optionally to the dryer 136). In some embodiments, the second fabric layer 116 may be provided with the second layer 122 of polymeric material before being engaged with the raw coated fabric 113.

In yet other embodiments, it is desired that a third coating of polymeric material be added to the coated fabric. In such cases, the second raw coated fabric 127 may be inverted by passing the second raw coated fabric 127 over guide rollers 129, 131. The second raw coated fabric 127 may then be fed through a third dispensing unit 128, which dispenses a third coating 130 of polymeric material onto another surface of the first base fabric 104 (opposite the top surface of the second fabric layer 116). A third knife 132 may be positioned opposite a third roller 133 to evenly spread the third layer 130 of polymeric material, generating a third raw coated fabric 135. In some examples, excess polymeric material 134 may build up on the leading edge of the third knife 132, and may require periodic cleaning.

The third raw coated fabric 135 may then be fed into the heat-setting unit 138 (optionally passing through the dryer 136 before the heat setting unit 138), producing a finished coated multi-threat fabric 140. The finished coated fabric 140 is sufficiently flexible that it may then be wound onto a roller 142 for transportation and/or storage.

The dispensing of the polymeric material may be performed automatically and may be controlled by a computer or other controller. Alternatively, the dispensing of polymeric material may take place semi-automatically or manually according to various techniques.

In some embodiments, the polymer coatings are applied to the fabric layers substantially continuously. Alternatively, the polymer coatings may be applied to the fabric layers is a discontinuous manner, with one or more gaps between coating portions on a particular surface of the fabric layers.

The stations and processes described above may be carried out on separate assembly lines or in a single assembly line. Further, the stations may comprise a single machine or separate machines. As noted above, the stations and processes performed may also be elements of a larger assembly line with pre or post-processing being performed, where desired. For example, the system 100 may be integrated with weaving or other fabric-making machines that may automatically generate the base fabric 104 and/or the second fabric layer 116.

The first layer 104 of base fabric and the second layer 116 of base fabric may comprise the same high performance fibers. Alternatively, the first layer 104 of base fabric and the second layer 116 of base fabric may have the different fiber compositions.

In some embodiments, one or more of the first coating 108, second coating 122 and third coating 130 may comprise the same or similar polymeric materials. In other embodiments, the first coating 108, second coating 122 and third coating 130 may comprise different polymeric materials.

One or more of the first coating 108, second coating 122 and third coating 130 may constitute a polymeric material applied at a coating weight of between 20 and 200 g/m$^2$. For example, the coating weight may be between 45-55 g/m$^2$. In other embodiments, the coating weight may be between 110-130 g/m$^2$. The weight of the coating may be varied depending on desired characteristics of the finished protective fabric and desired dry resin content after the raw coated fabric 127 has passed through the heat-setting unit 138. In some examples, the dry resin content is between 25-40%. In specific examples, the dry resin content may be about 30%.

It may be desired to pre-treat one or more of the base fabric 104 and second fabric layer 116 (which may include treatment of the fibers from which the base fabric 104 and second fabric layer 116 are made) to allow the polymeric material to better embed or bond with the base fabric 104 and second fabric layer 116. For example, the base fabric 104 and second fabric layer 116 may be plasma treated, corona treated, scoured or subjected to other types of pretreatment.

Figure 3:
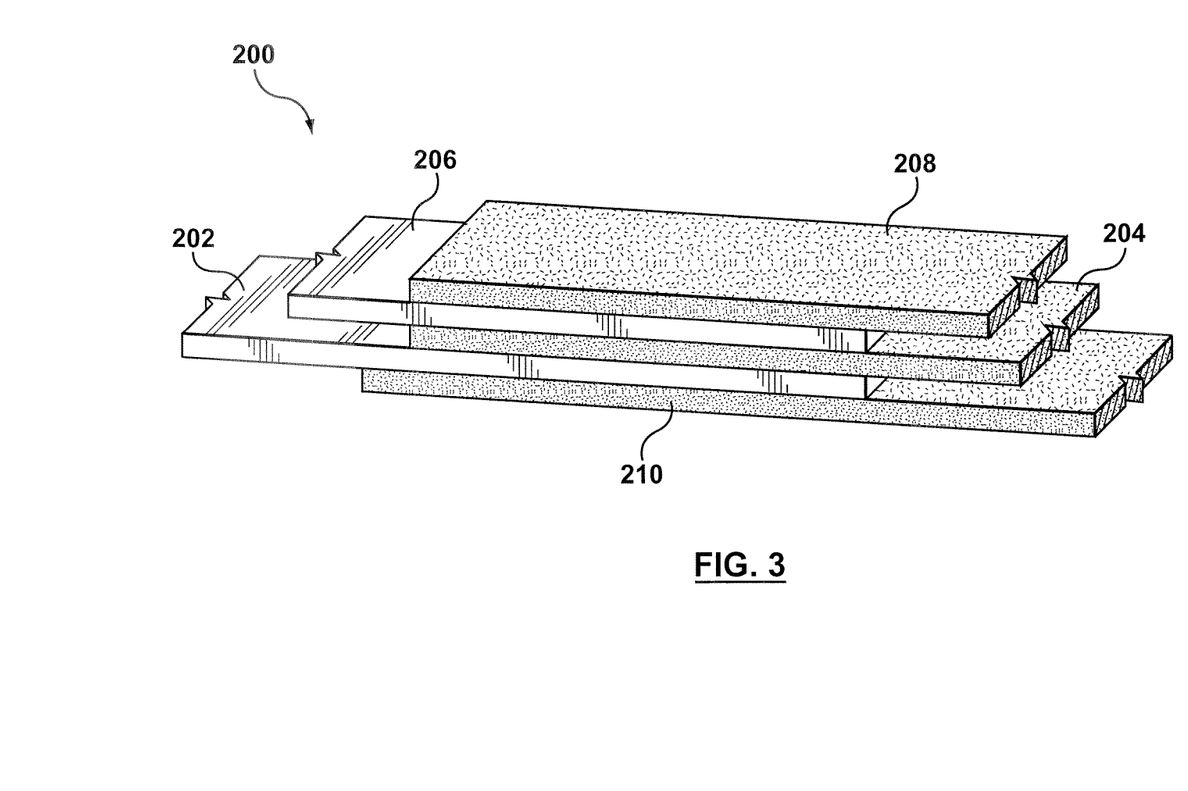
FIG. 3 is a perspective view of a coated fabric according to yet another embodiment.

Turning now to FIG. 3, there is shown a finished coated multi-threat fabric 200. The coated multi-threat fabric 200 includes a base fabric layer 202 and a first coating 204 of polymeric material bonded to a top surface of the first base fabric layer 202.

In some embodiments, the coated multi-threat fabric 200 may also include a second fabric layer 206 having a second surface facing and in contact with the first coating 204, with the first coating 204 between the base layer 202 and the second fabric layer 206 and bonded to both the base layer 202 and the second fabric layer 206. The second fabric layer 206 may also have a third surface opposite the base fabric layer 202, with a second coating 208 of polymeric material bonded thereto.

In some embodiments, the coated fabric 200 may also include a third coating 210 of polymeric material bonded to a fourth or bottom surface of the base fabric layer 202.

In one particular embodiment, a coated multi-threat fabric may be provided having the base fabric 202 and the second fabric layer 206, both made from high performance aramid fibers, with the first coating 204 having a coating weight of about 60 g/m$^2$, the second coating 208 having a coating weight of about 20 g/m$^2$, and no third coating.

In another particular embodiment, a coated multi-threat fabric may be provided having the base fabric 202 and the second fabric layer 206, both made from high performance aramid fibers, with the first coating 204 having a coating weight of about 60 g/m$^2$, the second coating 208 having a coating weight of about 60 g/m$^2$, and no third coating.

EXAMPLES

The following examples are illustrative of some exemplary embodiments of coated fabrics and are in no way meant to be limiting. In some examples, EAA copolymers were tested alone and/or in combination with cross-linkers as a coating on base fabrics and then tested for stab or ballistic performance. The stab and ballistic testing were conducted using well-known standards from the National Institutes of Justice (NIJ) and the Police Science Development Board (PSDB). In particular, stab resistance was tested under NIJ Standard 0115.00, Stab Resistance of Personal Body Armor, September 2000 and PSDB Body Armour Standards For UK Police (2003) Part 3 Knife and Spike Resistance. Ballistics were tested under NIJ Standard 0101.04, Ballistic Resistance of Personal Body Armor, September 2000 and PSDB Body Armour Standards For UK Police (2003) Part 2 Ballistic Resistance. Tables 1-4 below shows the results of these tests as well as the results obtained with a conventional protective material (Argus® available from Barrday Inc., Cambridge, Canada) prepared using a conventional film lamination process.

In a first example of a coated multi-threat fabric, a base fabric comprising a single layer of 930 dtex aramid (e.g Twaron) was coated with an EAA copolymer on both sides using a knife-over-roll, and then heat set according to methods described above. Tests were then conducted with a plurality of these coated multi-threat fabrics provided together. For example, twenty-seven layers of the first example fabric were plied together in one test, and twenty three layers of the first example fabric were plied together with a foam backing in a second test. The plurality of layers of the coated multi-threat fabrics may be loosely plied together, for example in an envelope or other carrier.

As shown in Table 1, the coated fabric had good performance when to the conventional fabric in a P1B KR1 and KR2 Blade tests. For example, in the KR1 test, the twenty seven layer sample of the first example coated multi-threat fabric had an areal density of 1.71 pounds per square foot (psf), while in the KR2 test, a thirty six layer sample had an areal density of 2.29 psf.

In a second example of a coated multi-threat fabric, the same base fabric comprising 930 dtex aramid was coated with a mixture of the EAA copolymer plus additional cross-linker on both sides, and heat set according to methods described above. As shown in Table 1, the second example also had good performance as compared to the conventional fabric in the P1B KR1 and KR2 Blade tests.

TABLE 1

| Description | Fabric Weight (g/m²) | P1B Blade KR1, E2 | | P1B Blade KR2, E2 | |
| --- | --- | --- | --- | --- | --- |
| | | Layers of fabric in test | Areal density (psf) | Layers | Areal density (psf) |
| Argus ® aramid sheet 930 dtex, film laminated | 320 | 25 | 1.64 | 34 | 2.23 |
| | | | | 24 + foam | 1.71 |
| Single layer roll aramid 930 dtex, EAA coated on 2-sides, heat set | 310 | 27 | 1.71 | 36 | 2.29 |
| | | 23 + foam | 1.62 | | |
| Single layer roll aramid 930 dtex, EAA + crosslinker coated on 2-sides, heat set | 321 | 20 + foam | 1.45 | 22 + foam | 1.58 |

Furthermore, as shown in Table 2 below, the second example of coated fabric also showed good performance in the PSDB Spike SP1 and SP2 tests.

TABLE 2

| Description | Fabric Weight (g/m²) | PSDB Spike SP1, E1 (0 mm) | | PSDB Spike SP2, E1 (0 mm) | |
| --- | --- | --- | --- | --- | --- |
| | | Layers of fabric in test | Areal density (psf) | Layers | Areal density (psf) |
| Argus ® aramid sheet 930 dtex, film laminated | 320 | 25 | 1.64 | 34 | 2.23 |
| | | | | 24 + foam | 1.71 |
| Single layer roll aramid 930 dtex, EAA + crosslinker coated on 2-sides, heat set | 321 | 20 + foam | 1.45 | 22 + foam | 1.58 |

This second example of coated multi-threat fabric also had good performance as compared to the conventional sheet fabric in ballistic testing, with an improved back-face deformation (BFD) or signature. NIJ standards generally define back-face deformation or signature as the depth of the depression made in the backing material created by a non-penetrating projectile impact. As shown in Table 3, the second example of coated multi-threat fabric had a BFD of 15 mm, as compared to 21.8 mm for the conventional sheet fabric, an improvement of approximately 31%.

TABLE 3

| Description | Fabric Weight (g/m²) | Threat | Layers of fabric in test | Areal Density (psf) | V0 Avg. BFD (mm) |
| --- | --- | --- | --- | --- | --- |
| Argus ® aramid sheet 930 dtex, film laminated | 320 | .357 Mag. | 22 + foam | 1.58 | 21.8 |
| Single layer aramid roll 930 dtex, EAA + crosslinker coated on 2-sides, heat set | 310 | .357 Mag. | 22 + foam | 1.53 | 15 |

Two examples of double layered multi-threat fabric were also tested, each having a base fabric layer, a second fabric layer, a first polymeric coating bonded to the base fabric layer and second fabric layer and a second polymeric coating provided on the second fabric layer.

In a first example of a double layered multi-threat fabric, two fabric layers of 1110 dtex aramid (e.g Twaron) were coated with a first coating of EAA copolymer between the fabric layers (the first coating having a coating weight of 60 g/m²), a second coating of EAA copolymer on the second fabric layer (the second coating having a coating weight of about 20 g/m²), and then heat set according to methods described above to produce a finished fabric.

In a second example of a double layered multi-threat fabric, two fabric layers of 1110 dtex aramid (e.g Twaron) were coated with a first coating of EAA copolymer between the fabric layers (the first coating having a coating weight of 60 g/m²), and a second coating of EAA copolymer on the second fabric layer (the second coating having a coating weight of about 60 g/m²), and then heat set according to methods described above to produce a finished fabric.

The first example and second example of double layer fabrics exhibited good performance in stab testing (e.g. P1B KR2 tests) and ballistic tests (9 mm V50, with DN Steel ammunition), and had good stiffness characteristics, as detailed in Table 4.

TABLE 4

| Description | Fabric + resin weight (g/m²) | KR2-E2 Layers of fabric in test | Areal density (kg/m²) | 9 mm V50(m/s) DN Steel | Stiffness (N) Layers | Stiffness (N) Warp | Stiffness (N) Weft |
|---|---|---|---|---|---|---|---|
| Standard aramid sheet 1110 dtex 1 × 1 24 × 24 | 335 | 27 | 9.1 | 487 | 27 | 12.8 | 17 |
| Double layer roll aramid 1110 dtex 1 × 1 24 × 24 20\|60\| | 498 | 16 + foam | 8.0 | 534 | 16 | 22.0 | 42.5 |
| Double layer roll aramid 1110 dtex 1 × 1 24 × 24 60\|60\| | 533 | 15 + foam | 8.0 | 491 | 15 | 44.3 | 67.4 |

Coated multi-threat fabrics as described herein tend to provide near-edge trauma attenuation with lower back face deformation values. Generally speaking, the coated fabrics are flexible and provide stab-resistance, ballistic resistance and trauma attenuation, making them effective against multi-threat articles or products.

In some examples, layers of the coated multi-threat fabrics may be plied together using known techniques, such as being sewn together, contained in an envelop or carrier, joined using an adhesive or resin, laminated, and the like. Similarly, coated multi-threat fabrics may be used by themselves or in combination with various other high performance fabrics and materials to produce protective materials.

For example, in soft armor applications, coated multi-threat fabrics may be used in any combination with fabrics made of high performance fibers as described above, or with other fabrics, and may replace a high performance material or combination of materials in existing protective materials.

In some applications, the proportions of each type of fabric (coated fabric or uncoated fabric) and the total weight of the protective material used may vary depending on the type of threat to be protected against (i.e. there may be particular specifications for ballistic materials vs. stab-resistant materials). Generally speaking, materials may be combined to assure that the combined coated multi-threat protective material passes a suitable test in a repeatable manner.

In some examples, coated multi-threat fabrics may be used in rigid armor applications. For example, the coated multi-threat fabric may be used with various resin systems to produce a rigid panel. In some examples, rigid panels may be used as armor by itself or in combination with other rigid panels made from various materials, including for example aramid, polyethylene, poly(p-phenylene-2,6-benzobisoxazole) (PBO) fibers, or glass fibers. Alternately, panels made from the coated multi-threat fabric alone or in combination with the above mentioned armor panels may act as a backer or trauma pack behind ceramic or metallic plates to form a composite armor system.

Many variations and modifications may be made using the coated fabric. Depending on the intended applications and/or threats, the number of layers of coated multi-threat fabrics and other fabrics or other materials and the exact weights of the combinations of materials may be readily ascertained by testing of the combinations. This testing is routinely completed by those conversant in the art of armor design.

Finished articles that may make use of the coated material include, but are not limited to, body armor, personal armor plates and shields, vehicle armor, bomb blankets and suits, mine clearance suits, helmets, electrical blast suppression blankets, fragmentation vests, chainsaw chaps and cut resistant aprons.

While the above description includes a number of exemplary embodiments, many modifications, substitutions, changes, and equivalents will now occur to those of ordinary skill in the art.

The invention claimed is:

1. A coated multi-threat fabric, comprising:
   at least one layer of fabric, each layer having a plurality of high performance fibers; and
   at least one coating of polymeric material bonded to the at least one layer of fabric, the polymeric material comprising an ethylene acrylic acid copolymer;
   wherein the ethylene acrylic acid copolymer has a melt flow index of between about 250 g/10min and 1400 g/10 min, a Shore D hardness of between about 40 and 55, an ultimate tensile strength of between about 5.0 and 12.0 MPa, and a molecular weight of between about 15,000 and 33,000; and
   wherein the ethylene acrylic acid copolymer is applied to the at least one layer of fabric as a liquid and then heated so as to flow into and to bond with the at least one layer of fabric.

2. The fabric of claim 1, wherein the high performance fibers have a tenacity of at least about 15 grams per denier, a tensile modulus of at least about 400 grams per denier, and a linear mass density between about 330dtex and 3360dtex.

3. The fabric of claim 2 wherein the high performance fibers are selected from the group consisting of aramid fibres, para-aramid fibres, ultra-high molecular weight polyethylene fibers, poly(p-phenylene-2,6-benzobisoxazole) (PBO) fibers, liquid crystal fibers, and glass fibers.

4. The coated multi-threat fabric of claim 1, wherein the at least one layer of fabric comprises a first fabric layer and a second fabric layer, and the at least one coating of polymeric material comprises a first coating provided between the first fabric layer and the second fabric layer, the first coating being bonded to both the first fabric layer and the second fabric layer, and a second coating bonded to the second fabric layer opposite the first fabric layer.

5. A coated multi-threat fabric, comprising:
   a. at least one layer of fabric, each layer of fabric having a plurality of high performance fibers selected from the group consisting of aramid fibres, para-aramid fibres, ultra-high molecular weight polyethylene fibers, poly(p-phenylene-2,6-benzobisoxazole) (PBO) fibers, liquid crystal fibers, and glass fibers; and b. at least one coating of polymeric material bonded to the at least one layer of fabric, the polymeric material selected from the group being an ethylene acrylic acid copolymers, the polymeric material having a melt flow index of between about 0.7 to 1400 g/10 min, a Shore D hardness of between about 36 and 75, and ultimate tensile strength of between about 5 and 75MPa;

wherein the at least one coating of polymeric material is applied to the at least one layer of fabric as a liquid and then heated so as to flow into and to bond with the at least one layer of fabric.

6. The fabric of claim 5, wherein the polymeric material is an ethylene acrylic acid copolymer with a melt flow index of between about 250 g/10 min and 1400 g/10 min at about 190 degrees C.

7. The fabric of claim 5, wherein the polymeric material is an ethylene acrylic acid copolymer having a Shore D hardness of between about 40 and 55.

8. The fabric of claim 5, wherein the polymeric material is an ethylene acrylic acid copolymer having an ultimate tensile strength of between about 5.0 and 12.0 MPa.

9. The fabric of claim 5, wherein the polymeric material is an ethylene acrylic acid copolymer having a molecular weight of between about 15,000 and 33,000.

10. The fabric of claim 5, wherein the at least one layer of fabric comprises a first fabric layer and a second fabric layer, and the at least one coating of polymeric material comprises a first coating provided between the first fabric layer and the second fabric layer, the first coating being bonded to both the first fabric layer and the second fabric layer, and a second coating bonded to the second fabric layer opposite the first fabric layer.

11. The fabric of claim 10, wherein the at least one coating further comprises a third coating bonded to the first fabric layer opposite the second fabric layer.

12. The fabric of claim 5, wherein the high performance fibers have a tenacity of at least about 15 grams per denier, a tensile modulus of at least about 400 grams per denier, and a linear mass density between about 330 dtex and 3360 dtex.

13. The fabric of claim 5, wherein the at least one fabric layer is selected from a group consisting of woven, knitted, plied and unidirectional fabrics.

14. A method of manufacturing a coated multi-threat fabric, comprising:
   a. providing a first fabric layer having a first surface, the first fabric layer having a plurality of high performance fibers;
   b. applying a first polymeric material onto the first surface of the first fabric layer, the polymeric material having a melt flow index of between about 0.7 to 1400 g/10 min, a Shore D hardness of between about 36 and 75, and ultimate tensile strength of between about 5 and 75 MPa wherein the polymeric material is an ethylene acrylic acid copolymer;
   c. spreading the first polymeric material onto the first surface of the first fabric layer so as to form a raw coated fabric having a first coating layer; and
   d. heating the raw coated fabric to bond the first coating layer to the first fabric layer;
   e. wherein the first polymeric material is selected such that the coated multi-threat fabric is flexible enough to be stored on a roll of a predetermined size.

15. The method of claim 14, wherein:
   a. the polymeric material has a melt flow index of between about 250 g/10 min and 1400 g/10min, a Shore D hardness of between about 40 and 55, an ultimate tensile strength of between about 5.0 and 12.0 MPa, and a molecular weight of between about 15,000 and 33,000; and
   b. the high performance fibres are selected from the group consisting of aramid fibres, para-aramid fibres, ultra-high molecular weight polyethylene fibers, poly(p-phenylene-2,6-benzobisoxazole) (PBO) fibers, liquid crystal fibers, and glass fibers.

16. The method of claim 14, wherein the spreading of the polymeric material results in the first coating layer having a coating weight of between about 20 and 200 g/m$^2$.

17. The method of claim 14, wherein the raw coated fabric is dried in a drying oven at a temperature of approximately 80-100 degrees C. for a period of between about 2-5 minutes, and the raw coated fabric is subsequently heated in a heat-setting unit at a temperature of approximately 150-200 degrees C. for at least 10 minutes.

18. The method of claim 14, further comprising:
   a. providing a second fabric layer having a second surface contacting the first coating layer opposite the first fabric layer, the second fabric layer having a third surface opposite the second surface;
   b. applying a second polymeric material onto the third surface of the second fabric layer, the second polymeric material selected from the group consisting of polyesters, polypropylenes, polyurethanes, polyethers, polybutadiene, polyacrylate, copolymers of ethylene, polycarbonates, ionomers, and ethylene acrylic acid copolymers;
   and c. spreading the second polymeric material onto the third surface of the second fabric layer so as to form a second coating layer on the raw coated fabric;
   d. wherein the heating of the raw coated fabric bonds the second coating layer to the second fabric layer.

19. The method of claim 18, wherein the first fabric layer comprises a fourth surface opposite the first surface, and further comprising:
   c. applying a third polymeric material onto the fourth surface of the first fabric layer, the third polymeric material selected from the group consisting of polyesters, polypropylenes, polyurethanes, polyethers, polybutadiene, polyacrylate, copolymers of ethylene, polycarbonates, ionomers, and ethylene acrylic acid copolymers; and
   d. spreading the third polymeric material onto the fourth surface of the third fabric layer so as to form a third coating layer on the raw coated fabric;
   e. wherein the heating of the raw coated fabric bonds the third coating layer to the first fabric layer.

* * * * *